(12) United States Patent
Kim

(10) Patent No.: US 7,324,068 B2
(45) Date of Patent: Jan. 29, 2008

(54) CHAINED IMAGE DISPLAY APPARATUS HAVING MUTUAL EXAMINING FUNCTION

(75) Inventor: Byoung-han Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 10/668,374

(22) Filed: Sep. 24, 2003

(65) Prior Publication Data

US 2004/0125045 A1 Jul. 1, 2004

(30) Foreign Application Priority Data

Oct. 4, 2002 (KR) ...................... 10-2002-0060524

(51) Int. Cl.
*G09G 5/00* (2006.01)

(52) U.S. Cl. .............................. 345/1.1; 345/7; 345/4; 345/5; 345/204

(58) Field of Classification Search ................. 345/1.1, 345/103, 117, 4, 5, 87, 97, 108–111, 204, 345/173, 77, 175, 30, 23, 7, 848; 179/18; 340/721; 361/728; 348/383, 463; 710/9, 710/48; 700/282, 83; 714/717, 713; 370/221; 705/12; 236/51; 386/46; 715/700; 702/178
See application file for complete search history.

(56) References Cited

U.S. PATENT DOCUMENTS

| | | | | |
|---|---|---|---|---|
| 4,006,456 A * | 2/1977 | Wilk | ............................ | 714/713 |
| 4,054,911 A * | 10/1977 | Fletcher et al. | ............. | 348/463 |
| 4,072,825 A * | 2/1978 | McLay et al. | ................. | 379/33 |
| 4,302,829 A * | 11/1981 | Morokawa et al. | ........... | 368/82 |
| 4,426,644 A * | 1/1984 | Neumann et al. | ............. | 345/23 |
| 4,527,250 A * | 7/1985 | Galdun et al. | .............. | 715/700 |
| 4,633,468 A * | 12/1986 | Skatrud et al. | ............. | 714/717 |
| 4,759,009 A * | 7/1988 | Casady et al. | .............. | 370/221 |
| 4,800,376 A * | 1/1989 | Suga et al. | ................... | 345/1.3 |
| 5,774,105 A * | 6/1998 | Yamamoto et al. | ........... | 345/97 |
| 5,877,745 A * | 3/1999 | Beeteson et al. | ........... | 345/156 |
| 5,943,507 A * | 8/1999 | Cornish et al. | ............... | 710/48 |
| 5,987,532 A * | 11/1999 | Tokui | ............................ | 710/9 |
| 6,137,490 A | 10/2000 | Shishido | ..................... | 345/343 |
| 6,502,060 B1 * | 12/2002 | Christian | .................... | 702/178 |
| 6,522,311 B1 * | 2/2003 | Kadowaki et al. | ............. | 345/7 |
| 6,851,621 B1 * | 2/2005 | Wacker et al. | ................ | 236/51 |
| 6,864,921 B2 * | 3/2005 | Kaneda et al. | ............. | 348/383 |
| 7,062,358 B2 * | 6/2006 | Larsson et al. | ............. | 700/282 |
| 7,123,220 B2 * | 10/2006 | Hanari et al. | ................. | 345/77 |
| 2001/0042005 A1 * | 11/2001 | McClure et al. | .............. | 705/12 |

(Continued)

*Primary Examiner*—Prabodh Dharia
(74) *Attorney, Agent, or Firm*—Staas & Halsey LLP

(57) ABSTRACT

A chained image display apparatus having a mutual examining function where a plurality of image display apparatuses, controlled by a central control unit and connected in series, recognize interruption of power to an image display apparatus and correspondingly notify the central control unit. The chained image display apparatus may include a control signal driving unit converting a control signal inputted to the image display apparatuses into a control signal having a predetermined level and buffering the control signal having the predetermined level, and an examining unit transmitting an alert signal, in response to a power supply to an image display apparatus among the plurality of image display apparatuses being interrupted, to next and previous image display apparatuses which are connected to the image display apparatus to which the power supply was interrupted, indicating that the power supply to the image display apparatus is interrupted.

24 Claims, 2 Drawing Sheets

U.S. PATENT DOCUMENTS

| | | | |
|---|---|---|---|
| 2001/0050659 A1* | 12/2001 | Sato et al. | 345/5 |
| 2002/0034067 A1* | 3/2002 | Massaro | 361/728 |
| 2002/0067318 A1* | 6/2002 | Matsuzaki et al. | 345/1.1 |
| 2002/0075163 A1* | 6/2002 | Smith et al. | 340/870.16 |
| 2002/0091991 A1* | 7/2002 | Castro | 717/106 |
| 2002/0140745 A1* | 10/2002 | Ellenby et al. | 345/848 |
| 2003/0006973 A1* | 1/2003 | Omura et al. | 345/175 |
| 2003/0190138 A1* | 10/2003 | Yuen et al. | 386/46 |
| 2004/0133289 A1* | 7/2004 | Larsson et al. | 700/83 |
| 2005/0007359 A1* | 1/2005 | Iseki et al. | 345/204 |

* cited by examiner

CHAINED IMAGE DISPLAY APPARATUS HAVING MUTUAL EXAMINING FUNCTION

CROSS-REFERENCE TO RELATED APPLICATIONS

This application claims the benefit of Korean Application No. 2002-60524, filed Oct. 4, 2002, in the Korean Intellectual Property Office, the disclosure of which is incorporated herein by reference.

BACKGROUND OF THE INVENTION

1. Field of the Invention

The present invention relates to an image display apparatus, and, more particularly, to a chained image display apparatus having a mutual examining function by which a plurality of image display apparatuses, controlled by a central control unit and connected with one another in series, recognize any interruption of power supply to one of the plurality of image display apparatuses and inform the central control unit of the power supply interruption.

2. Description of the Related Art

FIG. 1 is a block diagram showing a conventional chained image display apparatus. A first image display apparatus 100, a second image display apparatus 101, and an $n^{th}$ image display apparatus 103 are each configured to have a portion receiving a control signal and a buffer transmitting the received control signal to a next image display apparatus.

The conventional chained display image display apparatus is disclosed in U.S. Pat. No. 6,137,490.

The second image display apparatus 101 inputs and outputs a control signal through an input port 101-1 and an output port 101-2. A control signal driving unit 101-3 converts the control signal inputted through the input port 101-1 into a signal having a level that can be recognized by the second image display apparatus 101, and outputs the signal to a control unit 101-4. Then, the control signal driving unit 101-3 converts the signal output from the control unit 101-4 into a signal having a level that can be recognized by a next image display apparatus, e.g., a third image display apparatus (not shown), and outputs the signal to the third image display apparatus (not shown) through the output port 101-2.

In a conventional chained image display apparatus comprising a plurality of image display apparatuses connected with one another in series, if power supply of an image display apparatus, e.g., the second image display apparatus 101, is interrupted, the image display apparatuses following the image display apparatus, e.g., the third image display apparatus through the $n^{th}$ image display apparatus, can not be controlled by the central control unit. This is because a control signal output from the central control unit is sequentially transmitted through a previous image display apparatus, e.g., the first image display apparatus 100, to the next image display apparatus, e.g., the second image display apparatus 101. On the other hand, if the image display apparatuses are connected in parallel, only a limited number of image display apparatuses can be connected to the central control unit, thus the number of image display apparatuses connected to the central control unit cannot be increased.

SUMMARY OF THE INVENTION

The present invention provides a chained image display apparatus having a mutual examining function by which image display apparatuses, controlled by a central control unit and connected in series, recognize any interruption of power supply to one of the image display apparatuses and inform the central control unit.

According to an aspect of the present invention, there is provided a chained image display apparatus comprising a plurality of image display apparatuses connected in series and controlled by a central control unit, the chained image display apparatus comprising a control signal driving unit converting a control signal inputted to the image display apparatuses into a control signal having a predetermined level and buffering the control signal having the predetermined level; and an examining unit transmitting an alert signal, in response to a power supply to one image display apparatus among the plurality of image display apparatuses being interrupted, to next and previous image display apparatuses which are connected to the one image display apparatus to which the power supply was interrupted, indicating that the power supply to the one image display apparatus is interrupted.

The next and previous image display apparatuses, receiving the alert signal output from the examining unit, transmit the alert signal to the central control unit.

The examining unit comprises a connection unit receiving a voltage from the previous image display apparatus and supplying a supply voltage to the one image display apparatus to which the power supply was interrupted; and a switching unit routing the alert signal to the next and previous image display apparatuses in response to the power supply being interrupted.

The connection unit connects a driving voltage output from the previous image display apparatus to the one image display apparatus having the interrupted power supply and transmits an image signal, which is buffered by the one image display apparatus having the interrupted power supply, to the next image display apparatus.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
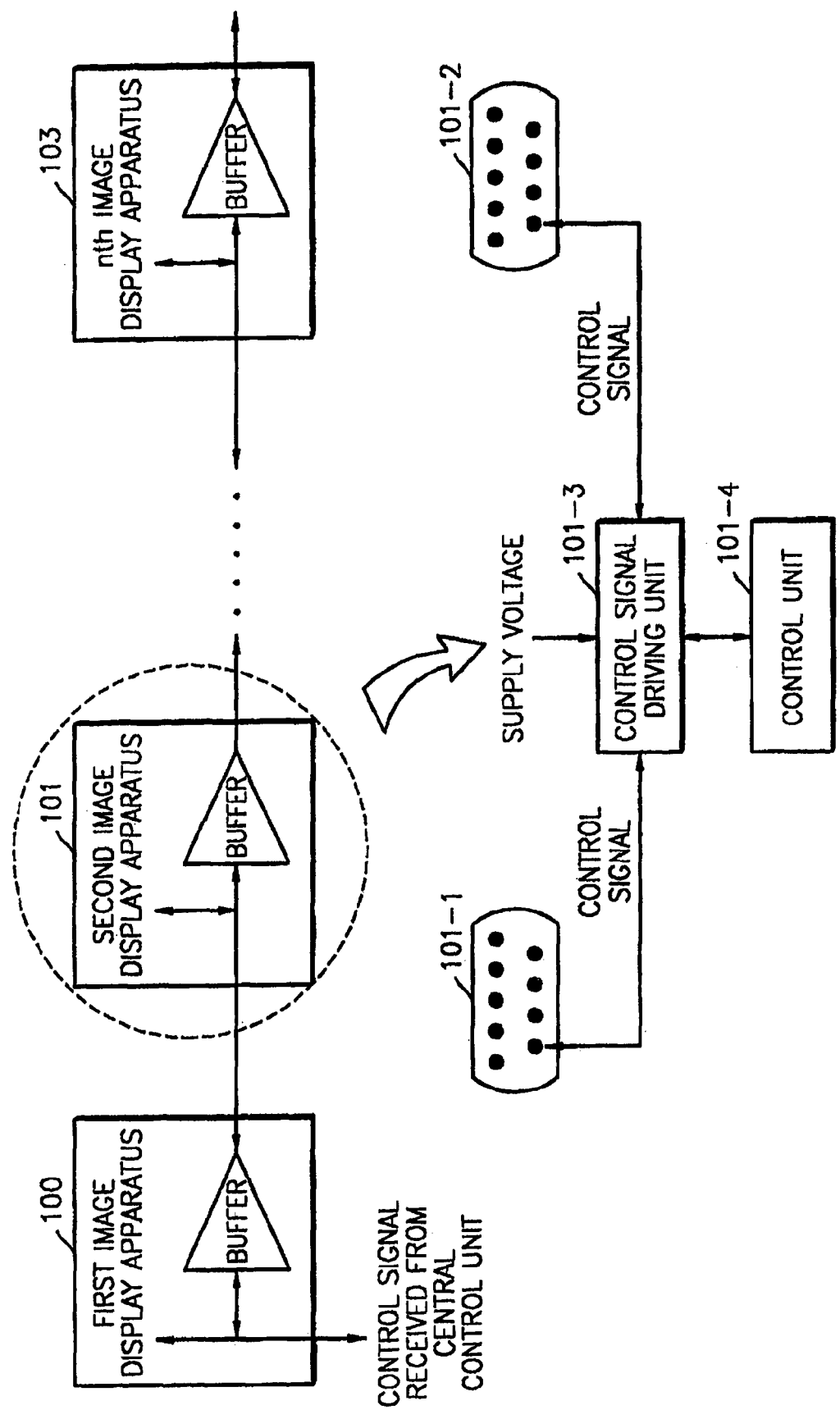
FIG. 1 is a block diagram showing a conventional chained image display apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
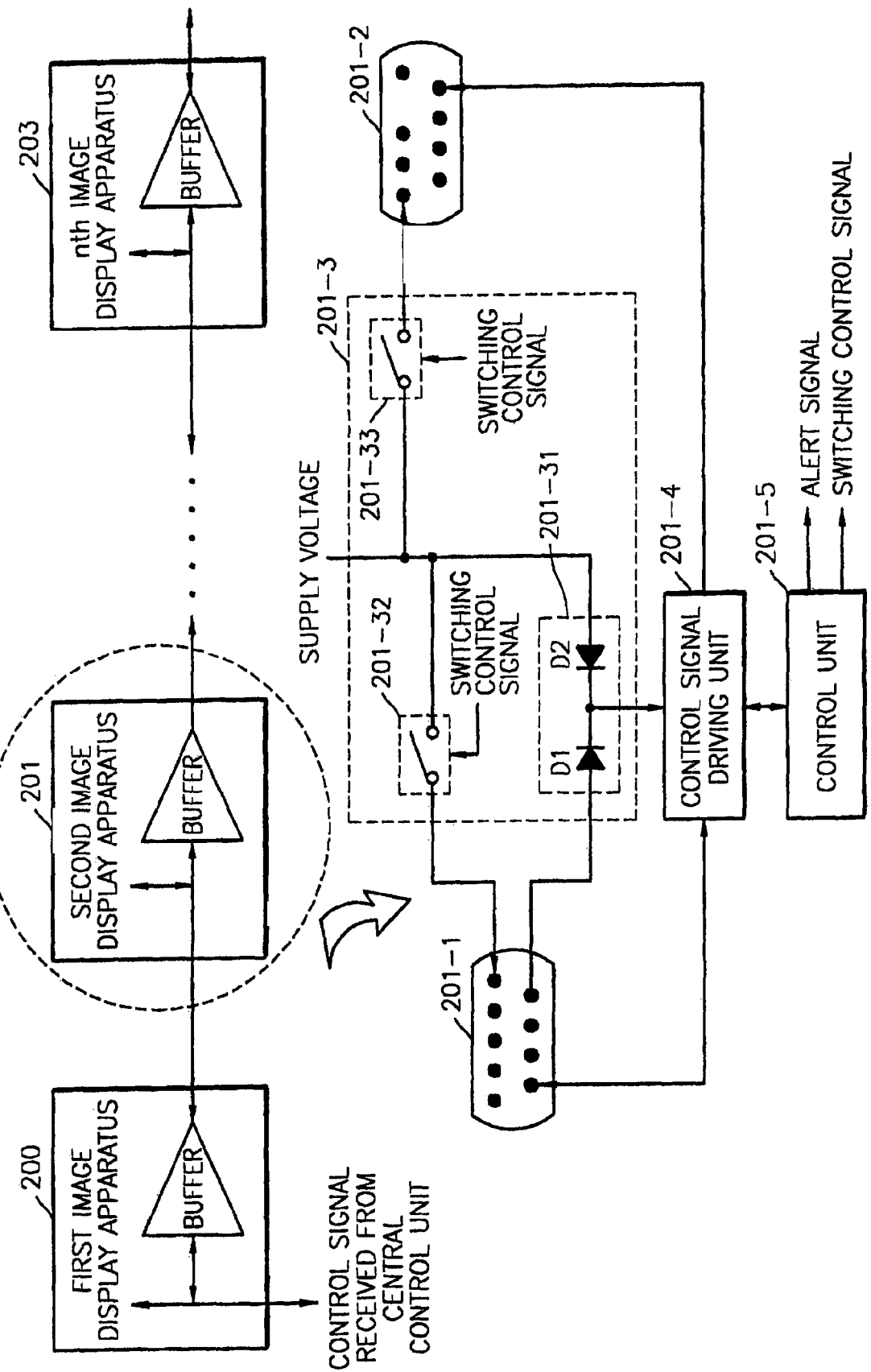
FIG. 2 is a block diagram showing a chained image display apparatus having a mutual examining function according to an embodiment of the present invention.

FIG. 2 is a block diagram showing a chained image display apparatus having a mutual examining function according to an embodiment of the present invention. The chained image display apparatus includes a first image display apparatus 200 having a buffer, a second image display apparatus 201 having a buffer, and an $n^{th}$ image display apparatus 203 having a buffer. The second image display apparatus 201 includes a control signal input port 201-1, a control signal output port 201-2, an examining unit 201-3, a control signal driving unit 201-4, and a control unit 201-5. The examining unit 201-3 includes a connection unit 201-31, a first switching unit 201-32, and a second switching unit 201-33.

Hereinafter, an embodiment of the present invention will be described in detail with reference to FIG. 2.

The first image display apparatus 200, the second image display apparatus 201, and the nth image display apparatus 203 respectively include a portion for receiving a control signal from a central control unit and a buffer for transmitting the received control signal to a next image display apparatus.

The chained image display apparatus having the mutual examining function will be described with reference to the second image display apparatus 201.

The second image display apparatus 201 inputs and outputs the control signal through an input port 201-1 and an output port 201-2, respectively.

The control signal driving unit 201-4 converts a control signal inputted through the input port 201-1 into a control signal having a level that can be recognized by the second image display apparatus 201 itself, and outputs the converted control signal to the control unit 201-5. Then, the control signal driving unit 201-4 converts the signal output from the control unit 201-5 into a control signal having a level that can be recognized by the next image display apparatus, i.e., a third image display apparatus (not shown), and outputs the converted control signal to the third image display apparatus (not shown) through the output port 201-2.

Hereinafter, operations of the examining unit 201-3 will be described. If the image display apparatuses connected in series operate normally, an internal supply voltage is inputted to the control signal driving unit 201-4 through D2 of the connection unit 201-31. The control signal driving unit 201-4 converts a control signal inputted through the input port 201-1 into a control signal having a level that can be recognized by the second image display apparatus 201 itself, and outputs the converted control signal to the control unit 201-5. Then, the control signal driving unit 201-4 converts the control signal output from the control unit 201-5 into a control signal having a level that can be recognized by the next image display apparatus, i.e., the third image display apparatus (not shown), and outputs the converted control signal to the third image display apparatus (not shown) through the output port 201-2.

During this normal operation, the control unit 201-5 outputs a switching control signal which is used to switch off the first switching unit 201-32 and the second switching unit 201-33.

However, if power supply of an image display apparatus of the image display apparatuses connected in series is interrupted, (here, the image display apparatus is assumed to be the second image display apparatus 201), a driving voltage 'a', of the first image display apparatus 200, is transmitted to the control signal driving unit 201-4 through D1 of the connection unit 201-31.

The control unit 201-5, which operates by using the driving voltage 'a', outputs a switching control signal used as an alert signal. Then, the first switching unit 201-32 and the second switching unit 201-33 switch to the alert signal, indicating that the power supply of the second image display apparatus 201 is interrupted, and transmit the alert signal to the first image display apparatus 200 and the third image display apparatus (not shown) through the input port 201-1 and the output port 201-2, respectively.

Then, the first image display apparatus 200 and the third image display apparatus (not shown) transmit the received alert signal to the central control unit, and the central control unit restores the driving voltage to the second image display apparatus 201.

Even though the supply voltage to the second image display apparatus 201 is interrupted, the driving voltage 'a' used to drive the first image display apparatus 200 is provided to the second image display apparatus 201. Therefore, the control signal driving unit 201-4 converts the control signal inputted through the input port 201-1 into a control signal having a level that can be recognized by the second image display apparatus 201 itself and outputs the converted control signal to the control unit 201-5. Then, the control signal driving unit 201-4 converts the signal output from the control unit 201-5 into a control signal having a level that can be recognized by the third image display apparatus (not shown), and outputs the converted control signal to the third image display apparatus (not shown) through the output port 201-2. Thus, image display apparatuses following the second image display apparatus 201, i.e., the third image display apparatus (not shown) through the nth image display apparatus, can operate normally. Here, a driving voltage 'b', used to drive the second image display apparatus 201, is provided to the third image display apparatus (not shown).

The characteristics of the chained image display apparatus having a mutual examining function according to the present invention are summarized in the following table.

| Signal | Normal operation | Voltage interrupted | Etc (Comparison to related art) |
|---|---|---|---|
| Supply voltage | Voltage is applied | Voltage is turned off | Voltage is turned off |
| Driving voltage a | Voltage is not applied | Voltage is applied | Not applicable |
| Driving voltage b | Voltage is not applied | Voltage is applied | Not applicable |
| Voltage | Voltage is applied | Voltage is applied | Voltage is turned off |
| Control signal | Normal operation | Normal operation | Abnormal operation |
| Alert signal | Switched off | Switched on | Not applicable |

According to the present invention, if the power supply to an image display apparatus among image display apparatuses connected in series, and controlled by a central control unit, is interrupted, the next and previous image display apparatuses connected to the image display apparatus to which the power supply was interrupted recognize the interruption of power supply and inform the central control unit of this situation, thus the power supply can be restored and the image display apparatus can operate normally.

Meanwhile, the above-mentioned embodiments, as well as other aspects, of the present invention may be implemented as a computer program. The program may be stored in machine readable media and read and executed by a computer. Example of suitable machine readable media include magnetic recording media such as ROMs, floppy disks, or hard disks, optical recording media such as CD ROMs or DVDs, and carrier waves such as transmission via the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A chained image display apparatus comprising a plurality of image display apparatuses connected in series and controlled by a central control unit, the chained image display apparatus comprising:
 a control signal driving unit converting a control signal inputted to the image display apparatuses into a control signal having a predetermined level and buffering the control signal having the predetermined level; and
 an examining unit transmitting an alert signal, in response to a power supply to one image display apparatus among the plurality of image display apparatuses being interrupted, to next and previous image display apparatuses which are connected to the one image display apparatus to which the power supply was interrupted, indicating that the power supply to the one image display apparatus is interrupted,
 wherein the examining unit comprises:
 a connection unit receiving a voltage from the previous image display apparatus and supplying a supply voltage to the one image display apparatus to which the power supply was interrupted; and
 a switching unit routing the alert signal to the next and previous image display apparatuses in response to the power supply being interrupted.

2. The chained image display apparatuses of claim 1, wherein each of the plurality of image display apparatuses further comprises:
 a portion receiving the control signal from the central control unit; and
 a buffer transmitting the received control signal to the next image display apparatus.

3. The chained image display apparatuses of claim 1, wherein the next and previous image display apparatuses, receiving the alert signal output from the examining unit.

4. The chained image display apparatuses of claim 1, wherein the switching unit comprises a first switching unit routing the alert signal to the previous image display apparatus, and a second switching unit routing the alert signal to the next image display apparatus.

5. The chained image display apparatuses of claim 4, further comprising a control unit, wherein the control unit outputs a switching control signal controlling the first and second switching units.

6. The chained image display apparatuses of claim 5, wherein the control unit sends the alert signal to the examining unit.

7. The chained image display apparatuses of claim 1, wherein the connection unit connects a driving voltage output from the previous image display apparatus to the one image display apparatus having the interrupted power supply and transmits an image signal, which is buffered by the one image display apparatus having the interrupted power supply, to the next image display apparatus.

8. The chained image display apparatuses of claim 7, wherein the driving voltage output from the previous image display apparatus is provided to the next image display apparatus.

9. A method of operating a plurality of image display apparatuses connected in series and controlled by a central control unit, the method comprising:
 converting a control signal inputted to the image display apparatuses into a control signal having a predetermined level, and buffering the control signal having the predetermined level;
 transmitting an alert signal in response to a power supply to one image display apparatus among the plurality of image display apparatuses being interrupted, to next and previous image display apparatuses which are connected to the one image display apparatus to which the power supply was interrupted, indicating the power supply to the one image display apparatus was interrupted;
 receiving a voltage from the previous image display apparatus and supplying a supply voltage to the one image display apparatus to which the power supply was interrupted; and
 routing the alert signal through a switching unit to the next and previous image display apparatuses in response to the power supply being interrupted.

10. The method of claim 9, further comprising transmitting the alert signal to the central control unit from the next and previous image display apparatuses.

11. The method of claim 9, wherein the alert signal is routed to the previous image display apparatus through a first switching unit, and the alert signal is routed to the next image display apparatus through a second switching unit.

12. The method of claim 11, further comprising controlling the first and second switching units with a control unit.

13. The method of claim 12, further comprising sending the alert signal to the examining unit from the control unit.

14. The method of claim 9, further comprising connecting a driving voltage output from the previous image display apparatus to the one image display apparatus having the interrupted power supply, and transmitting an image signal, which is buffered by the one image display apparatus having the interrupted power supply, to the next image display apparatus.

15. The method of claim 14, further comprising providing the driving voltage output from the previous image display apparatus to the next image display apparatus.

16. A system comprising a plurality of image display apparatuses connected in series and controlled by a central control unit, the system comprising:
 a control signal driving unit converting a control signal inputted to the image display apparatuses into a control signal having a predetermined level and buffering the control signal having the predetermined level; and
 an examining unit transmitting an alert signal, in response to a power supply to one image display apparatus among the plurality of image display apparatuses being interrupted, to next and previous image display apparatuses which are connected to the one image display apparatus to which the power supply was interrupted, indicating that the power supply to the one image display apparatus is interrupted,
 wherein the next and previous image display apparatuses, receiving the alert signal output from the examining unit, transmit the alert signal to the central control unit.

17. The system of claim 16, wherein each of the plurality of image display apparatuses further comprises:
 a portion receiving the control signal from the central control unit; and
 a buffer transmitting the received control signal to the next image display apparatus.

18. The system of claim 16, wherein the switching unit comprises a first switching unit routing the alert signal to the previous image display apparatus, and a second switching unit routing the alert signal to the next image display apparatus.

19. The system of claim 16, wherein the connection unit connects a driving voltage output from the previous image display apparatus to the one image display apparatus having the interrupted power supply and transmits an image signal, which is buffered by the one image display apparatus having the interrupted power supply, to the next image display apparatus.

20. The chained image display apparatuses of claim 19, wherein the driving voltage output from the previous image display apparatus is provided to the next image display apparatus.

21. A system comprising a plurality of image display apparatuses connected in series and controlled by a central control unit, the system comprising:
a control signal driving unit converting a control signal inputted to the image display apparatuses into a control signal having a predetermined level and buffering the control signal having the predetermined level; and
an examining unit transmitting an alert signal, in response to a power supply to one image display apparatus among the plurality of image display apparatuses being interrupted, to next and previous image display apparatuses which are connected to the one image display apparatus to which the power supply was interrupted, indicating that the power supply to the one image display apparatus is interrupted,
wherein the examining unit comprises:
a connection unit receiving a voltage from the previous image display apparatus and supplying a supply voltage to the one image display apparatus to which the power supply was interrupted; and
a switching unit routing the alert signal to the next and previous image display apparatuses in response to the power supply being interrupted.

22. The system of claim 21, further comprising a control unit, wherein the control unit outputs a switching control signal controlling the first and second switching units.

23. The system of claim 22, wherein the control unit sends the alert signal to the examining unit.

24. A machine readable storage medium storing a program for performing a method of operating a plurality of image display apparatuses connected in series and controlled by a central control unit, the method comprising:
converting a control signal inputted to the image display apparatuses into a control signal having a predetermined level, and buffering the control signal having the predetermined level;
transmitting an alert signal in response to a power supply to one image display apparatus among the plurality of image display apparatuses being interrupted, to next and previous image display apparatuses which are connected to the one image display apparatus to which the power supply was interrupted, indicating the power supply to the one image display apparatus was interrupted; and
receiving a voltage from the previous image display apparatus and supplying a supply voltage to the one image display apparatus to which the power supply was interrupted; and
routing the alert signal through a switching unit to the next and previous image display apparatuses in response to the power supply being interrupted.

* * * * *

UNITED STATES PATENT AND TRADEMARK OFFICE
CERTIFICATE OF CORRECTION

| | |
|---|---|
| PATENT NO. | : 7,324,068 B2 |
| APPLICATION NO. | : 10/668374 |
| DATED | : January 29, 2008 |
| INVENTOR(S) | : Byoung-han Kim |

It is certified that error appears in the above-identified patent and that said Letters Patent is hereby corrected as shown below:

Column 5, Line 40, change "unit." to --unit, transmit the alert signal to the central control unit.--.

Signed and Sealed this

First Day of July, 2008

JON W. DUDAS
*Director of the United States Patent and Trademark Office*